(12) United States Patent
Etling et al.

(10) Patent No.: US 6,443,673 B1
(45) Date of Patent: Sep. 3, 2002

(54) TUNABLE BORING BAR FOR SUPPRESSING VIBRATIONS AND METHOD THEREOF

(75) Inventors: Scott A. Etling, Latrobe, PA (US); Elliot L. Stern, Lutz, FL (US)

(73) Assignees: Kennametal Inc., Latrobe, PA (US); Design & Manufacturing Solutions, Inc., Tampa, FL (US)

(*) Notice: Subject to any disclaimer, the term of this patent is extended or adjusted under 35 U.S.C. 154(b) by 0 days.

(21) Appl. No.: 09/488,720

(22) Filed: Jan. 20, 2000

(51) Int. Cl.[7] .............................................. B23B 29/02
(52) U.S. Cl. ......................... 408/1 R; 74/574; 188/379; 408/143; 409/141
(58) Field of Search ................. 408/1 R, 143; 409/141; 188/322, 19, 378, 379; 74/574

(56) References Cited

U.S. PATENT DOCUMENTS

| | | |
|---|---|---|
| 2,051,954 A | 8/1936 | Leland |
| 3,242,791 A * | 3/1966 | Smith .......................... 408/143 |
| 3,447,402 A | 6/1969 | Ray |
| 3,582,226 A * | 6/1971 | Shurtliff ...................... 408/143 |
| 3,598,498 A | 8/1971 | Holmen ....................... 408/143 |
| 3,643,546 A | 2/1972 | Richter et al. ............... 90/11 A |
| 3,774,730 A | 11/1973 | Maddux ...................... 188/1 B |
| 3,838,936 A | 10/1974 | Andreassen et al. ........ 408/143 |
| 4,553,884 A | 11/1985 | Fitzgerald et al. .......... 408/143 |
| 4,817,003 A | 3/1989 | Nagase et al. ............... 364/463 |
| 5,413,318 A | 5/1995 | Andreassen .................. 267/140 |
| 5,518,347 A | 5/1996 | Cobb, Jr. ..................... 409/141 |
| 5,700,116 A | 12/1997 | Cobb, Jr. ..................... 409/141 |
| 5,810,528 A | 9/1998 | O'Connor et al. ........... 409/141 |

FOREIGN PATENT DOCUMENTS

GB 1179217 1/1970

\* cited by examiner

*Primary Examiner*—Daniel W. Howell
(74) *Attorney, Agent, or Firm*—Larry R. Meenan

(57) ABSTRACT

A tunable toolholder with a dynamic vibration absorber is disclosed wherein an absorber mass is compressed between two elastomer supports utilizing at least one longitudinally movable pressure plate to dynamically tune the toolholder.

29 Claims, 2 Drawing Sheets

TUNABLE BORING BAR FOR SUPPRESSING VIBRATIONS AND METHOD THEREOF

BACKGROUND OF THE INVENTION

1. Field of the Invention

This invention relates to a tunable toolholder for suppressing vibrations caused in machining processes and, more particularly, to a tunable toolholder which utilizes a dynamic vibration absorber to suppress vibrations.

2. Description of the Prior Art

During a metal cutting operation, any vibratory motion between a cutting tool and workpiece may lead to undesirable cutting performances such as poor workpiece surface finish and out-of-tolerance finished workpieces. Furthermore, such vibration may cause the cutting tool or the machine tool to become damaged.

To reduce these vibrations, the metal removal rate can be decreased. However, this approach interferes with production and only minimally reduces the amount of vibration.

Attempts to eliminate the vibration in the boring bar may also include using a boring bar fabricated from solid carbide. Solid carbide, because of its inherently high density, reduces the amount of chatter and vibration transferred to the boring bar. However, solid carbide is extremely expensive. Furthermore, although chatter and vibration are reduced by the inherently high density of the solid carbide bar, vibration nonetheless may build to an unacceptable level. Still furthermore, solid carbide is fairly brittle and a minor impact upon the boring bar during use or setup may inadvertently damage the bar.

A further attempt to reduce vibration in boring bars includes mounting upon or within the bar a dynamic vibration absorber, such as that absorber disclosed in U.S. Pat. No. 3,774,730, which is comprised of a cylindrical mass of a high density material supported on rubber bushings. When optimally tuned, the mass oscillates in response to vibration produced in the boring bar to cancel out vibration. The absorber may be tuned to accommodate the boring bar for the speed at which the workpiece or boring bar is rotating, the length of the boring bar and the type of cutting tool connected at the end of the bar. Such an adjustment is made by longitudinally urging pressure plates at opposing ends of the cylindrical mass thereby compressing the rubber bushings against the mass which simultaneously shifts the position of the mass and alters the stiffness of the rubber bushings to change the dynamics of the cylindrical mass.

However, even with such a design available, each time the boring bar is to be used under different conditions, it must be tuned using sophisticated equipment that may or may not be available on the shop floor.

U.S. Pat. No. 3,774,730 generally identifies the design of a tunable toolholder with a dynamic vibration absorber, however, this toolholder also must be tuned each time it is used under different conditions using equipment that may or may not be available on the shop floor.

Therefore, an object of the subject invention is to provide a tunable boring bar with a dynamic absorber capable of reliably suppressing vibration, and capable of being tuned without the need to employ sophisticated equipment each time the cutting conditions change.

SUMMARY OF THE INVENTION

The invention is directed to a method for tuning a toolholder having a diameter D, wherein the toolholder may be supported on a metalworking machine at different lengths along the tool to define different length to diameter ratios. The toolholder has a shank with a longitudinal axis and a central cavity extending within the shank along the axis. The central cavity defines a cavity wall. The toolholder also has a toolholder head adapted to receive a cutting tool. The head is attached, either as a separate piece to or integral with, the shank at a tool end of the shank. Additionally, the toolholder has a tunable absorber with an absorber mass inserted within the central cavity. The mass has a first end, a second end and an elastomer support circumscribing each end. Finally the toolholder has a pressure plate at each end of the absorber mass adjacent each elastomer support, wherein at least one pressure plate is movable along the longitudinal axis to compress the elastomer supports against the absorber mass. The method is comprised of the steps of:

a) positioning the at least one movable pressure plate to a reference location in which the compression of each elastomer support is known, b) supporting the shank on the metalworking machine at a first length L1 from the end of the shank to define a first length to diameter ratio, and c) moving the pressure plate from the reference location to a predefined first tuned location to adjust the compression upon each elastomer support thereby minimizing vibration for the tool supported at the first length to diameter ratio.

The invention is further directed to a tunable toolholder having an outside diameter D and which may be supported on a metalworking machine at different lengths L along the tool length to define different length to diameter ratios. The toolholder has a shank with a longitudinal axis, wherein a central cavity extends within the shank along the axis and wherein the central cavity defines a cavity wall. The toolholder also has a toolholder head adapted to receive a cutting tool and attached, as a separate piece or integral, to the toolholder at a tool end. The toolholder also has a tunable absorber having an absorber mass inserted within the central cavity, wherein the mass has a first end, a second end and an elastomer support circumscribing each end of the shank. Additionally the toolholder has a pressure plate at each end of the absorber mass adjacent each elastomer support, wherein at least one pressure plate is movable along the longitudinal axis to compress the elastomer supports against the absorber mass. Additionally, the toolholder has a positioning element for displacing the movable plate from one location to another along the longitudinal axis. Finally, the toolholder has tuning indicia for indicating the position along the longitudinal axis of the at least one movable pressure plate.

DESCRIPTION OF THE DRAWINGS

The invention, along with the object and advantages thereof, will be more apparent with the consideration of the detailed description read in conjunction with the accompanying drawings in which.

DETAILED DESCRIPTION OF THE INVENTION

The present invention is directed to a toolholder 10 which for purposes of this discussion will be a boring bar used for boring deep holes in work pieces.

Figure 1:
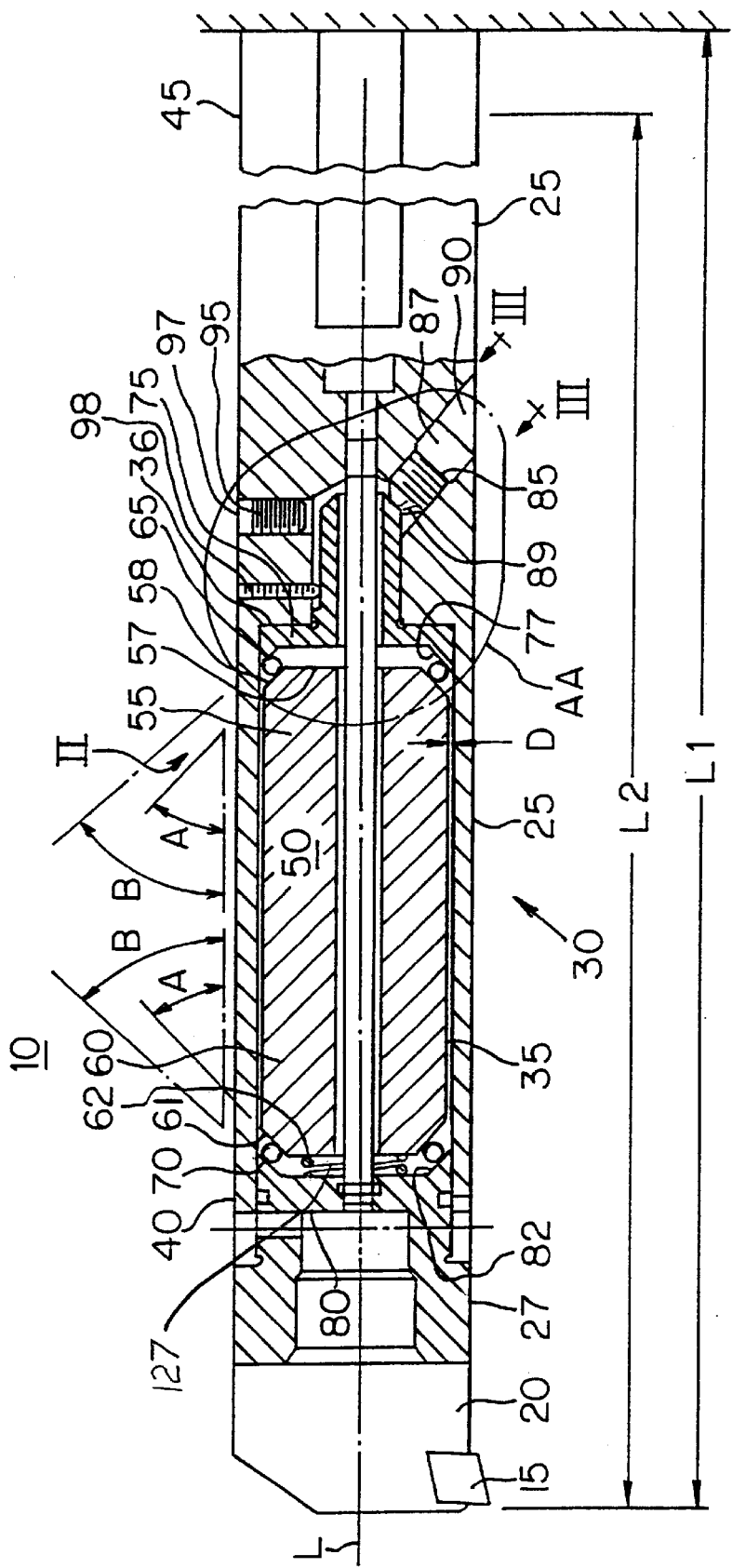
FIG. 1 is prior art and illustrates a cross-sectional view of a toolholder.

FIG. 1 illustrates a prior art boring bar 10 which is one type of toolholder addressed by the method of the subject invention. Modifications of this design will be discussed and will provide embodiments of the subject invention directed to an apparatus.

A cutting tool, such as a cutting insert 15, may be mounted in a conventional manner to a boring bar head 20 attached to the boring bar shank 25 at one end 27 of the shank. Use of the boring bar 10 in a metalworking operation will produce vibrations which travel through the boring bar 10 affecting the stability of the cutting process. For this reason, the boring bar 10 is provided with a tunable absorber 30 which will dampen the frequency vibration generated in the boring bar 10.

The boring bar 10 has a central cavity 35 extending inwardly from the boring bar end 27 to a cavity base 36. The boring bar 10 is supported at end 45 of the shank 25.

The boring bar 10, in accordance with the subject invention, may have an outside diameter from three-eighths to nine inches.

The tunable absorber 30 is comprised of a generally cylindrical absorber mass 50 having a first end 55 with an end portion 57 and a second end 60 with an end portion 62. The absorber mass 50 is inserted within the central cavity 35 of the boring bar shank 25. Each end portion has an outwardly facing conical surface 58,61 respectively. The conical surfaces 58,61 form with a line parallel to the longitudinal axis L an angle A of between 40–90 degrees. First elastomer support 65 and second elastomer support 70 circumscribe the conical surface 58 on the first end 55 and the conical surface 61 on the second end 60, respectively, of the absorber mass 50. A first pressure plate 75 and a second pressure plate 80 are positioned within the central cavity 35 proximate to the ends 55,60 of the absorber mass 50. The first pressure plate 75 has an inwardly facing conical surface 77 while the second pressure plate 80 also has an inwardly facing conical surface 82. The conical surface 77,82 form with a parallel to the longitudinal axis L an angle B of between 40–90 degrees.

Each pressure plate 75,80 surrounds an elastomer support 65,70 such that the inwardly facing conical surfaces 77,82 of the pressure plates 75,80 urge each elastomer support 65,70 against the respective conical surface 58,61 of the first end 55 and the second end 60 of the absorber mass 50.

The first pressure plate 75 is movable within the central cavity 35 along the longitudinal axis L. A positioning member 85, such as an adjusting screw, may be used to adjust the compression of the elastomer supports 65,70 against the absorber mass 50. As a positioning member, the adjusting screw 85 extends through a bore 90 from the outer surface of boring bar 10 to contact the first pressure plate 75. The adjusting screw 85 is threadably mated with the bore 90 such that the rotation of the adjusting screw 85 at the screw head 87 urges the contact end 89 of the adjusting screw 85 against or away from the first pressure plate 75 thereby displacing the first pressure plate 75 along the longitudinal axis L to increase or decrease the compression of the elastomer supports 65,70.

To tune the subject boring bar 10 it has, in the past, been necessary to monitor the vibration of the boring bar 10 and tighten or loosen the adjusting screw 85 thereby adjusting the pressure of the elastomer supports 65,70 against the absorber mass 50. However, this approach becomes cumbersome and the Applicant realized it is possible to predefine the amount of compression necessary on the elastomer supports against the absorber mass to minimize vibration under different tool conditions. In this manner, a machine operator may simply adjust the compression of the elastomer supports 65,70 to predetermine levels for tuning.

Specifically, the Applicant has discovered a method for tuning a toolholder comprised of the following steps. The at least one movable pressure plate 75 is positioned to a reference location in which the compression of each elastomer support 65,70 is known. The shank 25, which has a diameter D, is supported on a metalworking machine at a first length L1 from the tip of the cutting insert 15 to define a first length to diameter (L/D) ratio. The pressure plate 75 is then moved from the reference location to a predefined first tuned location to adjust the compression upon each elastomer support 65,70 thereby minimizing vibration from the toolholder supported at the first length L1.

The method may be further comprised of the step of supporting the shank 25 on the metalworking machine at a second length L2 from the end 27 of the shank 25 to define a second L/D ratio. The pressure plate 75 is then moved to a predefined second tuned location to adjust the compression upon each elastomer support 65,70 to a second tuned location thereby minimizing vibration for the toolholder 10 supported at the second length.

The reference location may be any position of the moveable pressure plate 75 in which the compression of the elastomer supports is known. As an example, the reference location may be defined by compressing each elastomer support 65,70 an amount between 5% and 30% of the elastomer uncompressed width between the pressure plates 75,80 and the ends 55,60 of the tunable absorber mass 50. Under these circumstances, moving the pressure plate 75 from the reference position to the first tuned location comprises increasing the compression of the elastomer supports 65,70. In an alternative embodiment the reference location is defined by compressing each elastomer support 65,70 an amount greater than 70% of the elastomer uncompressed with between the pressure plate 75 and the ends 55,60 of the absorber mass 50. Under these circumstances, the pressure plate 75 may be moved from the reference location to the first tuned location by reducing the compression on the elastomer supports 65,70.

The amount of compression of the pressure plate 75 upon the elastomer supports 65,70 is determined by the location of the pressure plate 75 along the longitudinal axis L.

There are different methods in which to identify the location of the pressure plate 75 along the longitudinal axis L and one method involves the use of a hole which extends through the cavity wall 35.

One such hole may be the locking screw hole 97 into which the locking screw 95 is positioned. The locking screw 95 is generally used to secure the movable pressure plate 75 in any of a number of different positions. However, in order to have a clear view through this hole 97 it is necessary to remove the locking screw 95. This provides a view of the movable pressure plate 75 so that the longitudinal position of the pressure plate 75 may be visually determined, which will reveal the amount the elastomer supports 65,70 are compressed. To prevent the movable pressure plate 75 from displacing the adjusting screw 85, the locking screw 95 is radially urged against the movable pressure plate 75 thereby securing it in one location.

Figure 2:
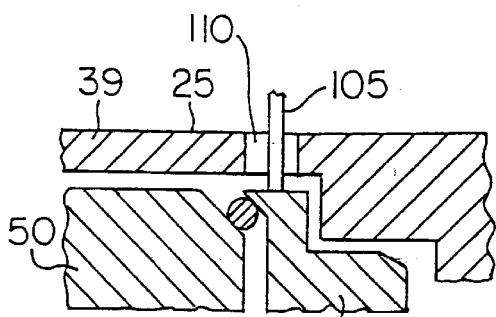
FIG. 2 illustrates an alternate embodiment of the enlarged sectional portion labeled as II in FIG. 1 in accordance with one embodiment of the subject invention.

In the alternative, illustrated in FIG. 2, a pin 105 may extend radially outwardly from the pressure plate 75 through a slot 110 in the cavity wall 39 of the shank 25. By the longitudinal position of the pin 105, it is possible to visually determine the longitudinal location of the pressure plate 75.

In the alternative the adjusting screw 85 may be turned a predetermined amount to move the pressure plate 75 to a desired location. More specifically and with reference to FIG. 3, the screw head 87 of the adjusting screw 85 may have radial markings 88 associated with matching radial markings indicated by letters A, B, C, D in FIG. 3. The adjusting screw 85 is turned a predetermined amount based upon these marks to move the pressure plate 75 to a desired location thereby achieving a desired compression of the elastomer support 65,70.

With the understanding that by displacing the movable pressure plate 75 a predetermined amount, it is possible to tune the toolholder 10 under different L/D ratios, then different mechanisms may be used to impart such displacement. Such mechanisms may include a hydraulic piston or a rack and pinion gear arrangement which design is known to those skilled in the art.

Figure 4:
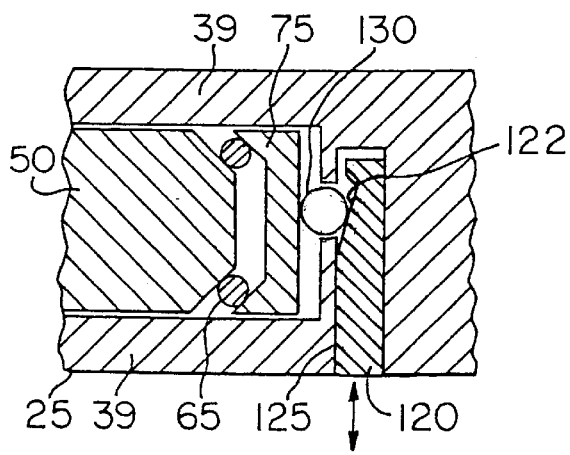
FIG. 4 illustrates a sectional view of an alternate embodiment of detail "AA" in FIG. 1.

Furthermore, while adjusting screw 85 has been discussed as the primary mechanism for displacing the movable pressure plate 75, other devices are also possible. Directing attention to FIG. 4, a wedge 120 is radially positioned within a hole 125 extending through the cavity wall 39 of the shank 25. A ramp 122 on the wedge 120 longitudinally displaces an adjusting ball 130 against the surface of the movable pressure plate 75, thereby again urging the movable pressure plate 75 against the elastomer supports 65,70.

Figure 5:
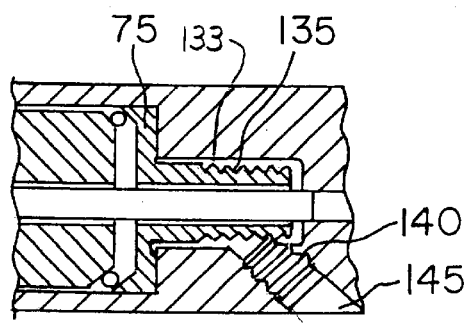
FIG. 5 illustrates a sectional view of another alternate embodiment of detail "AA" in FIG. 1.

FIG. 5 illustrates an alternate embodiment for displacing the movable pressure plate 75. In particular, concentric threads 133 on shaft 135 are engaged by threads 140 of a bolt 145 to provide rack and pinion arrangement.

Figure 6:
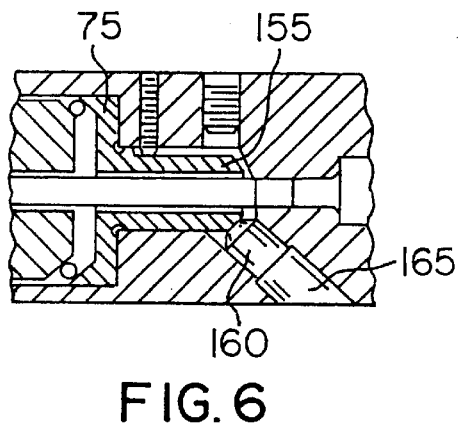
FIG. 6 illustrates a sectional view of yet another alternate embodiment of detail "AA" in FIG. 1.

FIG. 6 illustrates yet another alternate embodiment for displacing the movable pressure plate 75. In particular, the shaft 155 is displaced by a piston 160 which has an adjacent hydraulic chamber 165 that may be pressurized with hydraulic fluid to displace the piston 160 and consequently displace the shaft 155 and the pressure plate 75.

Since the purpose of displacing the movable pressure plate 75 has been to adjust the compression of the elastomer support 65,70 upon the absorber mass 50, it is also possible to monitor the longitudinal force exerted by the movable pressure plate 75 against the elastomer support 65,70 and to laterally displace the pressure plate 75 in accordance with the desired force. This may be accomplished by attaching to the pressure plate 75 a force-measuring device such as a transducer and to tighten or loosen the adjusting screw 85 in accordance with the force revealed by the transducer. Such a transducer may, for example, be mounted between the adjusting ball 130 and the plate 75 in FIG. 4. Additionally, the force may be measured by monitoring the torque applied to the adjusting screw 85 using, for example, a torque wrench.

Figure 3:
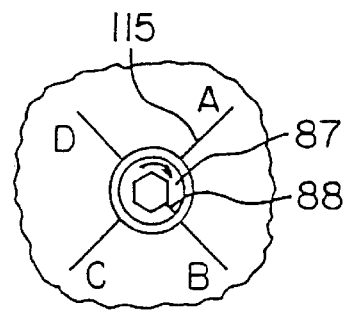
FIG. 3 illustrates a top view of the portion highlighted by arrows 3—3 in FIG. 1 in accordance with a second embodiment of the subject invention.

A guide pin 98 is threadably secured within the shank 25 and engages a surface of the pressure plate 75 to limit rotations of the pressure plate 75 about the longitudinal axis L. FIG. 2 indicates a pin 105 which may be visually monitored to determine the position of the pressure plate 75 and FIG. 3 illustrates calibrated radial markings 115 used to determine the position of the pressure plate 75. Each of these may be generally referred to as tuning indicia for indicating the position along the longitudinal axis L of the at least one movable pressure plate 75.

Under certain circumstances, the boring bar 10 may be oriented such that the longitudinal axis L is in a vertical direction. In order to compensate for the weight of the absorber mass 50, a resilient support, illustrated by spring 127, may be inserted between the absorber mass 50 and the pressure plate 80 such that the entire weight of the absorber mass 50 is not directly against the lowermost elastomer support. By providing such a spring, the force upon both elastomer supports 65, 70 may be equal when the movable pressure plate 75 is used to compress these supports.

The absorber mass 50 may be made of carbide or any other material which preferably has a density greater than that of steel. Additionally, the elastomer supports 65,70 may be made of an elastomer material having a Durometer A Scale 50 material.

Although this invention has been described with respect to certain embodiments, various modifications, revisions and additions will become evident to persons of ordinary skill in the art. All such modifications, revisions and additions are intended to be encompassed in the scope of this invention, which is limited only by the claims appended hereto.

We claim:

1. A method for tuning a toolholder having a diameter D, wherein the toolholder may be supported on a metalworking machine at different lengths along the tool to define different length to diameter ratios, wherein the toolholder has
    i) a shank having a longitudinal axis, wherein a central cavity extends within the shank along the axis and wherein the central cavity defines a cavity wall,
    iii) a toolholder head adapted to receive a cutting tool and attached to the shank at a tool end of the shank,
    iii) a tunable absorber having an absorber mass inserted within the central cavity, wherein the mass has a first end, a second end and an elastomer support circumscribing each end,
    iv) a pressure plate at each end of the absorber mass adjacent each elastomer support, wherein at least one pressure plate is movable along the longitudinal axis to compress the elastomer supports against the absorber mass, wherein the method is comprised of the steps of:
    a) positioning the at least one movable pressure plate to a reference location in which the compression of each elastomer support is known;
    b) supporting the shank on the metalworking machine at a first length L1 from the end of the shank to define a first length to diameter ratio; and
    c) moving the pressure plate from the reference location to a predefined first tuned location to adjust the compression upon each elastomer support thereby minimizing vibration for the tool supported at the first length to diameter ratio, wherein a pin extends radially outwardly from the pressure plate through a slot in the cavity wall of the shank and the longitudinal location of the pressure plate may be visually determined by looking at the position of the pin, wherein the amount of compression of the pressure plate upon the elastomer supports is determined by the longitudinal location of the pressure plate.

2. The method according to claim 1 further including the steps of:
    d) supporting the shank on the metalworking machine at a second length L2 from the end of the shank to define a second length to diameter ratio; and e) moving the pressure plate to a predefined second tuned location to adjust the compression upon each elastomer support to a second tuned compression thereby minimizing vibration for the tool supported at the second length to diameter ratio.

3. The method according to claim 1 wherein the reference location is any location of the movable pressure plate in which the compression of the elastomer supports is known.

4. The method according to claim 3 wherein the reference location is defined by compressing each elastomer support an amount between 5% and 30% of the elastomer uncompressed width between the pressure plates and the ends of the tunable absorber.

5. The method according to claim 4 wherein moving the pressure plate from the reference position to the first tuned location comprises increasing the compression on the elastomer supports.

6. The method according to claim 3 wherein the reference location is defined by compressing each elastomer support an amount greater than 70% of the uncompressed width between the pressure plate and the ends of the tunable absorber.

7. The method according to claim 6 wherein moving the pressure plate from the reference location to the first tuned location requires reducing the compression on the elastomer supports.

8. A tunable toolholder having an outside diameter D and supported on a metalworking machine at different lengths L along the tool length to define different length to diameter ratios, wherein the toolholder has
   i) a shank having a longitudinal axis, wherein a central cavity extends within the shank along the axis and wherein the central cavity defines a cavity wall;
   ii) a toolholder head adapted to receive a cutting tool and attached to the toolholder at a tool end;
   iii) a tunable absorber having an absorber mass inserted within the central cavity, wherein the mass has a first end, a second end and an elastomer support circumscribing each end of the shank;
   iv) a pressure plate at each end of the absorber mass adjacent each elastomer support, wherein at least one pressure plate is movable along the longitudinal axis to compress the elastomer supports against the absorber mass;
   v) a positioning element for displacing the movable plate from one location to another along the longitudinal axis; and
   vi) tuning indicia for indicating the position along the longitudinal axis of the at least one movable pressure plate, wherein each elastomer is made of a Durometer A Scale 50 material.

9. The tunable toolholder according to claim 8 wherein each elastomer support circumscribes a conical surface at each end of the absorber mass and each pressure plate has an inwardly facing conical surface which surrounds each elastomer support.

10. The tunable toolholder according to claim 8 wherein the tooholder is a boring bar.

11. A tunable toolholder having an outside diameter D and supported on a metalworking machine at different lengths L along the tool length to define different length to diameter ratios, wherein the toolholder has
   i) a shank having a longitudinal axis, wherein a central cavity extends within the shank along the axis and wherein the central cavity defines a cavity wall;
   ii) a toolholder head adapted to receive a cutting tool and attached to the toolholder at a tool end;
   iii) a tunable absorber having an absorber mass inserted within the central cavity, wherein the mass has a first end, a second end and an elastomer support circumscribing each end of the shank;
   iv) a pressure plate at each end of the absorber mass adjacent each elastomer support, wherein at least one pressure plate is movable along the longitudinal axis to compress the elastomer supports against the absorber mass;
   v) a positioning element for displacing the movable plate from one location to another along the longitudinal axis; and
   vi) tuning indicia for indicating the position along the longitudinal axis of the at least one movable pressure plate, further including a locking pin extending through the cavity wall to engage and secure the at least one movable pressure plate in a position.

12. The tunable toolholder according to claim 11 further including an axial support between the absorber mass and one end of the central cavity to provide support to the absorber mass during operation of the tool in the vertical position.

13. A method for tuning a toolholder having a diameter D, wherein the toolholder may be supported on a metalworking machine at different lengths along the tool to define different length to diameter ratios, wherein the toolholder has
   i) a shank having a longitudinal axis, wherein a central cavity extends within the shank along the axis and wherein the central cavity defines a cavity wall,
   ii) a toolholder head adapted to receive a cutting tool and attached to the shank at a tool end of the shank,
   iii) a tunable absorber having an absorbed mass inserted within the central cavity, wherein the mass has a first end, a second end and an elastomer support circumscribing each end,
   iv) a pressure plate at each end of the absorber mass adjacent each elastomer support, wherein at least one pressure plate is movable along the longitudinal axis to compress the elastomer supports against the absorber mass, wherein the method is comprised of the steps of:
      a) positioning the at least one movable pressure plate to a reference location in which the compression of each elastomer support is known;
      b) supporting the shank on the metalworking machine at a first length L1 from the end of the shank to define a first length to diameter ratio; and
      c) moving the pressure plate from the reference location to a predefined first tuned location to adjust the compression upon each elastomer support thereby minimizing vibration for the tool supported at the first length to diameter ratio, wherein the adjusting screw has a head with radial markings placed upon which indicate the longitudinal location of the pressure plate and wherein an adjusting screw is turned a predetermined amount based upon these marks to move the pressure plate to a desired location, wherein the plate is moved by an adjusting screw threaded within and extending from an outer surface of the shank through the cavity wall to the pressure plate.

14. A method for tuning a toolholder having a diameter D, wherein the toolholder may be supported on a metalworking machine at different lengths along the tool to define different length to diameter ratios, wherein the toolholder has
   i) a shank having a longitudinal axis, wherein a central cavity extends within the shank along the axis and wherein the central cavity defines a cavity wall, ii) a toolholder head adapted to receive a cutting tool and attached to the shank at a tool end of the shank, iii) a tunable absorber having an absorber mass inserted within the central cavity, wherein the mass has a first end, a second end and an elastomer support circumscribing each end, iv) a pressure plate at each end of the absorber mass adjacent each elastomer support, wherein at least one pressure plate is movable along the longitudinal axis to compress the elastomer supports against the absorber mass, wherein the method is comprised of the steps of:

a) positioning the at least one movable pressure plate to a reference location in which the compression of each elastomer support is known;

b) supporting the shank on the metalworking machine at a first length L1 from the end of the shank to define a first length to diameter ratio; and c) moving the pressure plate from the reference location to a predefined first tuned location to adjust the compression upon each elastomer support thereby minimizing vibration for the tool supported at the first length to diameter ratio; wherein the pressure plate is positioned using a hydraulic piston.

15. The method according to claim 14 wherein the pressure plate is positioned using a wedge radially movable relative to the longitudinal axis.

16. A method for tuning a toolholder having a diameter D, wherein the toolholder may be supported on a metalworking machine at different lengths along the tool to define different length to diameter ratios, wherein the toolholder has i) a shank having a longitudinal axis, wherein a central cavity extends within the shank along the axis and wherein the central cavity defines a cavity wall, ii) a toolholder head adapted to receive a cutting tool and attached to the shank at a tool end of the shank, iii) a tunable absorber having an absorber mass inserted within the central cavity, wherein the mass has a first end, a second end and an elastomer support circumscribing each end, iv) a pressure plate at each end of the absorber mass adjacent each elastomer support, wherein at least one pressure plate is movable along the longitudinal axis to compress the elastomer supports against the absorber mass, wherein the method is comprised of the steps of:

a) positioning the at least one movable pressure plate to a reference location in which the compression of each elastomer support is known;

b) supporting the shank on the metalworking machine at a first length L1 from the end of the shank to define a first length to diameter ratio; and c) moving the pressure plate from the reference location to a predefined first tuned location to adjust the compression upon each elastomer support thereby minimizing vibration for the tool supported at the first length to diameter ratio, wherein after the pressure plate has been positioned in a desired location, the pressure plate is locked at that location.

17. The method according to claim 16 wherein the pressure plate is locked using a locking screw extending through the cavity wall and pressing against the pressure plate.

18. A method for tuning a toolholder having a diameter D, wherein the toolholder may be supported on a metalworking machine at different lengths along the tool to define different length to diameter ratios, wherein the toolholder has i) a shank having a longitudinal axis, wherein a central cavity extends within the shank along the axis and wherein the central cavity defines a cavity wall, ii) a toolholder head adapted to receive a cutting tool and attached to the shank at a tool end of the shank, iii) a tunable absorber having an absorber mass inserted within the central cavity, wherein the mass has a first end, a second end and an elastomer support circumscribing each end, iv) a pressure plate at each end of the absorber mass adjacent each elastomer support, wherein at least one pressure plate is movable along the longitudinal axis to compress the elastomer supports against the absorber mass, wherein the method is comprised of the steps of:

a) positioning the at least one movable pressure plate to a reference location in which the compression of each elastomer support is known;

b) supporting the shank on the metalworking machine at a first length L1 from the end of the shank to define a first length to diameter ratio; and c) moving the pressure plate from the reference location to a predefined first tuned location to adjust the compression upon each elastomer support thereby minimizing vibration for the tool supported at the first length to diameter ratio, further including the step of resiliently supporting the absorber mass when the toolholder is used in a vertical orientation.

19. The method of claim 18 wherein the step of resiliently supporting the absorber mass involves supporting the mass with a spring mounted within the central cavity.

20. A method for tuning a toolholder having a diameter D, wherein the toolholder may be supported on a metalworking machine at different lengths along the tool to define different length to diameter ratios, wherein the toolholder has i) a shank having a longitudinal axis, wherein a central cavity extends within the shank along the axis and wherein the central cavity defines a cavity wall, ii) a toolholder head adapted to receive a cutting tool and attached to the shank at a tool end of the shank, iii) a tunable absorber having an absorber mass inserted within the central cavity, wherein the mass has a first end, a second end and an elastomer support circumscribing each end, iv) a pressure plate at each end of the absorber mass adjacent each elastomer support, wherein at least one pressure plate is movable along the longitudinal axis to compress the elastomer supports against the absorber mass, wherein the method is comprised of the steps of:

a) positioning the at least one movable pressure plate to a reference location in which the compression of each elastomer support is known;

b) supporting the shank on the metalworking machine at a first length L1 from the end of the shank to define a first length to diameter ratio; and c) moving the pressure plate from the reference location to a predefined first tuned location to adjust the compression upon each elastomer support thereby minimizing vibration for the tool supported at the first length to diameter ratio, wherein the step of positioning the at least one movable pressure plate to a reference location in which the compression of each elastomer support is known is comprised of monitoring the force the pressure plate applies to the elastomer supports and positioning the pressure plate to a desired location based upon this force.

21. A tunable toolholder having an outside diameter D and supported on a metalworking machine at different lengths L along the tool length to define different length to diameter ratios, wherein the toolholder has i) a shank having a longitudinal axis, wherein a central cavity extends within the shank along the axis and wherein the central cavity defines a cavity wall;

ii) a toolholder head adapted to receive a cutting tool and attached to the toolholder at a tool end;

iii) a tunable absorber having an absorber mass inserted within the central cavity, wherein the mass has a first end, a second end and an elastomer support circumscribing each end of the shank;

iv) a pressure plate at each end of the absorber mass adjacent each elastomer support, wherein at least one pressure plate is movable along the longitudinal axis to compress the elastomer supports against the absorber mass;

v) a positioning element for displacing the movable plate from one location to another along the longitudinal axis; and vi) tuning indicia for indicating the position along the longitudinal axis of the at least one movable pressure plate, wherein the reference location is defined by a physical stop within the shank cavity upon which the at least one movable pressure plate rests.

22. The tunable toolholder according to claim 21 wherein the elastomer supports are compressed an amount greater than 70% of the elastomer uncompressed width between the pressure plate and the ends of the tunable absorber.

23. A tunable toolholder having an outside diameter D and supported on a metalworking machine at different lengths L along the tool length to define different length to diameter ratios, wherein the toolholder has i) a shank having a longitudinal axis, wherein a central cavity extends within the shank along the axis and wherein the central cavity defines a cavity wall;

ii) a toolholder head adapted to receive a cutting tool and attached to the toolholder at a tool end;

iii) a tunable absorber having an absorber mass inserted within the central cavity, wherein the mass has a first end, a second end and an elastomer support circumscribing each end of the shank;

iv) a pressure plate at each end of the absorber mass adjacent each elastomer support, wherein at least one pressure plate is movable along the longitudinal axis to compress the elastomer supports against the absorber mass;

v) a positioning element for displacing the movable plate from one location to another along the longitudinal axis; and vi) tuning indicia for indicating the position along the longitudinal axis of the at least one movable pressure plate, wherein the positioning element is an adjusting screw extending through the cavity wall, contacting the pressure plate and oriented to displace the pressure plate along the longitudinal axis, wherein the tuning indicia is comprised of a head on the adjusting screw with at least one calibration line which may be aligned with at least one mating calibration line on an external surface of the shank indicating at least one position in which the toolholder will be tuned for at least one length to diameter ratio.

24. The tunable toolholder according to claim 23 wherein the positioning element is comprised of a wedge which when moved displaces the at least one pressure plate.

25. A tunable toolholder having an outside diameter D and supported on a metalworking machine at different lengths L along the tool length to define different length to diameter ratios, wherein the toolholder has i) a shank having a longitudinal axis, wherein a central cavity extends within the shank along the axis and wherein the central cavity defines a cavity wall;

ii) a toolholder head adapted to receive a cutting tool and attached to the toolholder at a tool end;

iii) a tunable absorber having an absorber mass inserted within the central cavity, wherein the mass has a first end, a second end and an elastomer support circumscribing each end of the shank;

iv) a pressure plate at each end of the absorber mass adjacent each elastomer support, wherein at least one pressure plate is movable along the longitudinal axis to compress the elastomer supports against the absorber mass;

v) a positioning element for displacing the movable plate from one location to another along the longitudinal axis; and vi) tuning indicia for indicating the position along the longitudinal axis of the at least one movable pressure plate, wherein the positioning element is comprised of a rack and pinion arrangement.

26. A tunable toolholder having an outside diameter D and supported on a metalworking machine at different lengths L along the tool length to define different length to diameter ratios, wherein the toolholder has i) a shank having a longitudinal axis, wherein a central cavity extends within the shank along the axis and wherein the central cavity defines a cavity wall;

ii) a toolholder head adapted to receive a cutting tool and attached to the toolholder at a tool end;

iii) a tunable absorber having an absorber mass inserted within the central cavity, wherein the mass has a first end, a second end and an elastomer support circumscribing each end of the shank;

iv) a pressure plate at each end of the absorber mass adjacent each elastomer support, wherein at least one pressure plate is movable along the longitudinal axis to compress the elastomer supports against the absorber mass;

v) a positioning element for displacing the movable plate from one location to another along the longitudinal axis; and vi) tuning indicia for indicating the position along the longitudinal axis of the at least one movable pressure plate, wherein the tuning indicia is comprised of a pin attached to the movable pressure plate and extends through a slot in the cavity wall to reveal the position of the pressure plate along the longitudinal axis and the compression of the pressure plates.

27. The tunable toolholder according to claim 21 wherein the elastomer supports are compressed an amount between 5% and 30% of the elastomer uncompressed width between the pressure plate and the ends of the tunable absorber.

28. The tunable toolholder according to claim 21 wherein the at least one movable pressure plate compresses the elastomer supports to a known amount.

29. The tunable toolholder according to claim 21 wherein the position of the pressure plate is such that the elastomer supports are compressed a known amount.

* * * * *